United States Patent
Bruening et al.

(10) Patent No.: US 7,222,478 B2
(45) Date of Patent: May 29, 2007

(54) HEADER FOR HARVESTING CROPS HAVING STALKS

(75) Inventors: Ulrich Bruening, Coesfeld (DE); Klemens Weitenberg, Borken (DE); Martin Huening, Billerbeck (DE); Leo Schulze Hockenbeck, Everswinkel (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/876,975

(22) Filed: Jun. 25, 2004

(65) Prior Publication Data
US 2005/0005589 A1  Jan. 13, 2005

(30) Foreign Application Priority Data
Jul. 8, 2003  (DE)  ............... 103 30 669

(51) Int. Cl.
*A01D 45/02* (2006.01)
(52) U.S. Cl. ............... 56/51; 56/53; 56/503
(58) Field of Classification Search .......... 56/51, 56/60, 101, 53, 94, 153, 500, 502, 503
See application file for complete search history.

(56) References Cited

U.S. PATENT DOCUMENTS

| | | | |
|---|---|---|---|
| 4,426,827 A * | 1/1984 | Oosterling et al. | 56/13.6 |
| 4,926,623 A * | 5/1990 | Fiener | 56/60 |
| 5,237,804 A | 8/1993 | Bertling | |
| 5,546,737 A * | 8/1996 | Moosbrucker | 56/94 |
| 5,722,225 A | 3/1998 | Wuebbels et al. | |
| 6,073,429 A * | 6/2000 | Wuebbels et al. | 56/11.3 |
| 6,119,443 A * | 9/2000 | Rauch | 56/64 |
| 6,298,643 B1 * | 10/2001 | Wuebbels et al. | 56/60 |
| 6,430,907 B2 * | 8/2002 | Wolters et al. | 56/64 |
| 6,658,832 B2 * | 12/2003 | Wubbels et al. | 56/94 |
| 6,775,967 B2 * | 8/2004 | Wubbels | 56/60 |
| 6,826,897 B2 * | 12/2004 | Wubbels | 56/51 |
| 2003/0101703 A1 | 6/2003 | Wubbels | |

FOREIGN PATENT DOCUMENTS

| | | |
|---|---|---|
| DE | 39 09 754 A | 3/1989 |
| DE | 298 20 638 U1 | 2/1999 |
| DE | 199 53 521 A | 11/1999 |
| DE | 199 53 521 | 5/2001 |
| DE | 102 22 310 A | 5/2002 |
| DE | 102 49 458 A1 | 5/2003 |
| EP | 0 508 189 A | 3/1992 |
| EP | 0 760 200 A | 6/1996 |
| EP | 1 008 291 A | 11/1999 |
| GB | 2 012 154 A | 1/1979 |
| WO | WO 02/62128 A | 1/2002 |

* cited by examiner

*Primary Examiner*—Thomas B. Will
*Assistant Examiner*—Alicia Torres

(57) ABSTRACT

A crop harvesting header includes a compact arrangement of side-by-side mounted intake and mowing units, cross conveyors and deflection coveyors, which operate to efficiently deliver cut crop to a central outlet at the rear side of the header. Some of the compactness is attributable to a drive arrangement which makes it possible to mount the axes of rotation of certain cross conveyors respectively within the cylindrical envelopes described by the peripheries of the vertically spaced intake disks of the intake and mowing devices.

10 Claims, 7 Drawing Sheets

HEADER FOR HARVESTING CROPS HAVING STALKS

FIELD OF THE INVENTION

The invention relates to a header for harvesting crops having stalks, with several intake and mowing devices arranged laterally one next to the other for cutting and conveying the harvested crops, of which, on one side of the longitudinal center plane of the machine there is a first intake and mowing device and a second intake and mowing device arranged next to the first device at a greater distance from the longitudinal center plane of the machine than the first intake and mowing device, and with a deflection conveyor unit that has a rotational axis inclined slightly forward in order to bridge the vertical distance between the working plane of the intake and mowing devices and the plane of the intake channel of a harvesting machine and to introduce the harvested crops into the intake channel of a harvesting machine, wherein the first intake and mowing device can be driven such that it conveys the mown crops first inwards and then rearwards

BACKGROUND OF THE INVENTION

In DE 39 09 754 A, a harvesting device for introducing stalk fodder is described, for which four rotating cutting disks are arranged laterally one next to the other. The cut crops are received at their rear side by a cross auger. The cutting disks rotate, each in the same sense, on the two sides of the longitudinal center plane, wherein the crops are conveyed first outwards and then rearwards. WO 02/062128 A shows a machine with the same general configuration.

DE 199 53 521 A shows a cutting and conveying device for stalk crops, which has four cutting and conveying rotors arranged laterally one next to the other. The rotational sense of the cutting and conveying rotors is such that the crops are conveyed first inwards and then rearwards. At the rear side of the cutting and conveying rotors there is a cross auger, which conveys the harvested crops from the outer cutting and conveying rotors to the center of the machine, where they are conveyed rearwards into the field chopper through the center region of the cross auger together with the crops running in from the inner cutting and conveying rotors.

In EP 0 760 200 A, a machine for harvesting crops having stalks is disclosed, for which several intake and mowing drums are distributed over the working width. The crops are transported inwards to the rear side of the intake and mowing drums along the rear wall. On the two sides of the longitudinal center plane, the intake and mowing drums rotate in the same sense with the exception of the outer intake and mowing drums, so that the crops are conveyed first outwards and then rearwards. This rotational direction enables the use of cross auger drums in the wedge-shaped region of adjacent intake and mowing drums. The material is fed from the intake and mowing drums arranged farther to the outside through the cross auger drums to the inner intake and mowing drums. They feed this material, together with the crops harvested by the inner intake and mowing drums, to the diagonal conveyor drums, which convey the gathered crop material upwards and rearwards into the intake channel of the field chopper.

The intake and mowing drums of EP 1 008 291 A rotate with the same rotational sense as those of EP 0 760 200 A. The cross conveyance, however, behind the intake and mowing drums is created by a separate cross conveyor, which is separate from the intake and mowing drums.

In FIGS. 10 and 11 of GB 2 012 154 A, a corn harvesting machine is shown, for which two receiving drums are arranged on opposite sides of the longitudinal center plane. The outer receiving drums rotate outwards, while the inner receiving drums rotate inwards. At the rear side, the harvested crops are conveyed through a belt conveyor or a worm conveyor inwards to the center of the machine and then deflected rearwards into the intake channel of a chopper.

DE 102 22 310 A discloses a machine for harvesting corn, for which the inner intake and mowing drums turn inwards. They feed the crops to deflection conveyor units in the form of diagonal conveyor drums, which convey the crops upwards and rearwards into the intake channel of the harvesting machine. The crops from the outer intake and mowing drums rotating outwards are fed to the diagonal conveyor drums behind the last intake and mowing drums by a separate cross conveyor, because conveyance through the rear sides of the inner intake and mowing drums against the selected rotational direction is not possible. The cross conveyor can be located in front of or behind the cross conveyor channel.

The machine disclosed in EP 0 760 200 A, wherein the cross conveyor drums interact with the intake and mowing drums, has the advantage of a short construction, so that the field chopper carrying them must absorb only a relatively small torque. The machine proposed in DE 102 22 310 A also has a short construction. However, a few mowing drums for these machines rotate in the opposite sense, so that infeed problems occur in the infeed region between these mowing drums. The machines according to DE 39 09 754 A, DE 199 53 521 A, WO 02/062128 A, EP 1 008 291 A, and GB 2 012 154 A are significantly longer in the direction of motion due to the cross conveyor acting independently of the intake and mowing drums in the form of worm or band conveyors and place more stress on the field chopper. The construction according to EP 0 508 189 A is only suitable in a restrictive way for working widths like those achieved with the previously mentioned machines.

The invention is based on the problem of designing a compact crop harvester header for harvesting crops having stalks, for which the disadvantages mentioned above are present not at all or only to a small degree.

SUMMARY OF THE INVENTION

According to the present invention, there is provided an improved arrangement of a crop harvester header equipped with a plurality of intake and mowing drums An object of the invention is to provide a crop harvesting header including first and second intake and mowing devices mounted in side-by-side relationship to each other at one side of a longitudinal center plane of the header, with both the first and second intake and mowing devices being driven so that cut crop is conveyed first inwards toward said center plane and then rearwards.

The invention relates to a harvesting header for mowing crops having stalks, for which at least one first intake and mowing device and one subsequent outer second intake and mowing device, which is offset outwards relative to the inner intake and mowing device, are arranged one next to the other to the side of a longitudinal center plane relative to the direction of travel. In the center of the machine behind the intake and mowing devices, there is a deflection conveyor unit, which has an approximately vertical, but slightly forwardly inclined rotational axis for overcoming the difference in height between the working plane of the intake and mowing devices and the plane of the intake channel of a self-propelled harvesting machine carrying the header. The deflection conveyor unit is preferably a diagonal conveyor drum, which is provided in particular with conveyor disks arranged one above the other with pushers distributed over their circumferences. A use of a conveyor equipped with tension means (chains or belts) as the deflection conveyor unit would also be conceivable. Relative to the worm conveyors frequently used in the prior art, this deflection conveyor has the advantage that it is smaller and lighter. The first intake and mowing device turns the harvesting operation first inwards and then rearwards. Therefore, two first intake and mowing devices arranged symmetrically in the center (on both sides of the longitudinal center plane) of a machine draw in the harvested crops between themselves, which is then especially advantageous when crop stalks run into this region. The second intake and mowing device rotates such that it conveys the crops first inwards and then rearwards, i.e., in the same sense as the first intake and mowing device. One advantage is that the rotational direction of all intake and mowing devices on one side of the machine is the same, so that infeed problems between oppositely rotating intake and mowing devices are eliminated. In addition, a large number of the same parts are used.

Due to the selected rotational direction of the first intake and mowing device like that disclosed in EP 0 508 189 A and EP 0 760 200 A, which makes more difficult a transport of the harvested crops through the rear region of the first intake and mowing device, a separate cross conveyor element is advantageous in order to convey the harvested crops from the second intake and mowing device inwards to the center of the machine, where they are then conveyed through the deflection conveyor unit into the intake channel of a harvesting machine carrying the machine. The cross conveyor element thus works independent of the first intake and mowing device and conveys the harvested crops from the second intake and mowing device independently through a cross conveyor channel, which is located in the direction of travel behind the first intake and mowing device, to the deflection conveyor unit. However, instead of the separate cross conveyor element, the harvested crops could also be input to the first intake and mowing device and allowed to circulate to its front side. It should be further mentioned that the cross conveyor element described in the following can also be used in machines, for which the intake and mowing devices have the rotational directions shown in DE 102 22 310 A.

In one advantageous embodiment, the cross conveyor element is arranged before the cross conveyor channel. The active conveyance of the harvested crops running from the second intake and mowing device is realized by elements, which are located at the front side of the cross conveyor channel relative to the direction of travel of the machine. In this way, a compact construction of the machine can be achieved.

The cross conveyor element could be a worm conveyor, a conveyor belt, or a chain conveyor provided with suitable pushers. However, due to the advantages of a simple and low-wear construction, a rotary conveyor with an arbitrary, suitable rotational axis is preferred. In one embodiment, the cross conveyor element could be a conveyor disk introduced into the cross conveyor channel from above or from below with a horizontal rotational axis oriented perpendicular to the direction of travel. One advantage of a conveyor disk relative to a worm conveyor is the defined feeding of the harvested crops to the subsequent conveyor. The rotational axis extends in a different embodiment parallel to the rotational axis of the first intake and mowing device. To achieve a compact construction, the rotational axis of the cross conveyor element can be arranged within the envelope of the first intake and mowing device.

At the rear side of the cross conveyor channel, an active cross conveyor element could likewise be attached in order to improve the crop conveyance. However, to be able to form the machine compactly, it is proposed to form the rear side of the cross conveyor channel by a rear wall, which is attached rigidly or spring mounted, but which is not driven. The rear wall allows a simple and secure conveyance of the harvested crops through the cross conveyor channel in interaction with the cross conveyor element.

The function of the cross conveyor element is to convey the harvested crops from the second intake and mowing device to the rear side of the first intake and mowing device, i.e., to bridge approximately the width of the first intake and mowing device. Therefore, it is advantageous to give the cross conveyor element a radius, which approximately matches the radius of the first intake and mowing device. However, the use of several smaller cross conveyor elements would also be conceivable.

In a preferred embodiment, the cross conveyor element is assembled from one or more coaxial conveyor disks, which are provided in a known way with grooves or recesses for receiving plant stalks. The conveyor disk(s) or any other conveyor elements of the cross conveyor element is, or are, located between coaxial conveyor disks of the intake and mowing device, which are also provided in a known way with grooves for receiving plant stalks. The rotational axis of the conveyor disks of the cross conveyor element is offset relative to the rotational axis of the conveyor disks of the intake and mowing device, as a rule, towards the rear in the direction of travel of the machine. The conveyor disks can be held by a suitable gear housing, which also contains the associated drive elements. The connection of the gear housing below and above the cross conveyor element can be realized by a connection element, which is located within a hollow shaft, which is used for driving the cross conveyor element.

As a rule, the first intake and mowing device is arranged directly next to the longitudinal center plane of the machine. Therefore, two first intake and mowing devices arranged on opposite sides of the longitudinal center plane draw in the harvested crops, so that almost no crop conveyor problems appear here. However, it would also be conceivable to arrange another intake and mowing device with arbitrary rotational direction between the first intake and mowing device and the longitudinal center plane of the machine. The first intake and mowing device can be offset laterally arbitrarily far relative to the longitudinal center plane of the machine for certain embodiments, especially when the machine is built asymmetrically and/or has an uneven number of intake and mowing devices.

For increasing the working width, third intake and mowing devices can be provided at the side of the second intake and mowing devices, which are spaced even farther from the longitudinal center plane of the machine. It is also conceivable to use fourth, fifth, etc., intake and mowing devices. Due to the selected rotational direction of the second intake and mowing device, a separate conveyance of the harvested crops is advantageous at the rear side of the second intake and mowing device. A cross conveyor element can be used for this purpose, which is similar to the cross conveyor element at the rear side of the first intake and mowing device. In the wedge-shaped region between adjacent cross conveyor elements, a cross conveyor drum can be arranged, as described in EP 0 760 200 A.

The third intake and mowing devices arranged farthest to the outside preferably rotate such that they convey the crops initially inwards and then rearwards, which has the advantage that a conveyance of the harvested crops along its rear side is unnecessary, the crops reception in the region between the third and second intake and mowing devices is improved, and the construction of the machine is simplified. However, they could also rotate in the opposite sense to the first and second intake and mowing devices. If four or more intake and mowing devices are used, the construction of the third intake and mowing devices corresponds to the second intake and mowing devices.

As a rule, the deflection conveyance unit is also used for transport of the crops from the first intake and mowing device. It receives the crops preferably downstream of the reception area of the crops from the second intake and mowing device (as a rule, from the cross conveyor element), so that the two transition regions at the deflection conveyor unit are independent of each other.

The machine is preferably built symmetrically, i.e., there are two first and two second and optionally arbitrarily many other (two third, two fourth, etc.) intake and mowing devices on either side of the longitudinal center plane.

BRIEF DESCRIPTION OF THE DRAWINGS

Six embodiments of the invention, which are described in more detail in the following, are shown in the drawings.

DESCRIPTION OF THE PREFERRED EMBODIMENT

Figure 1:
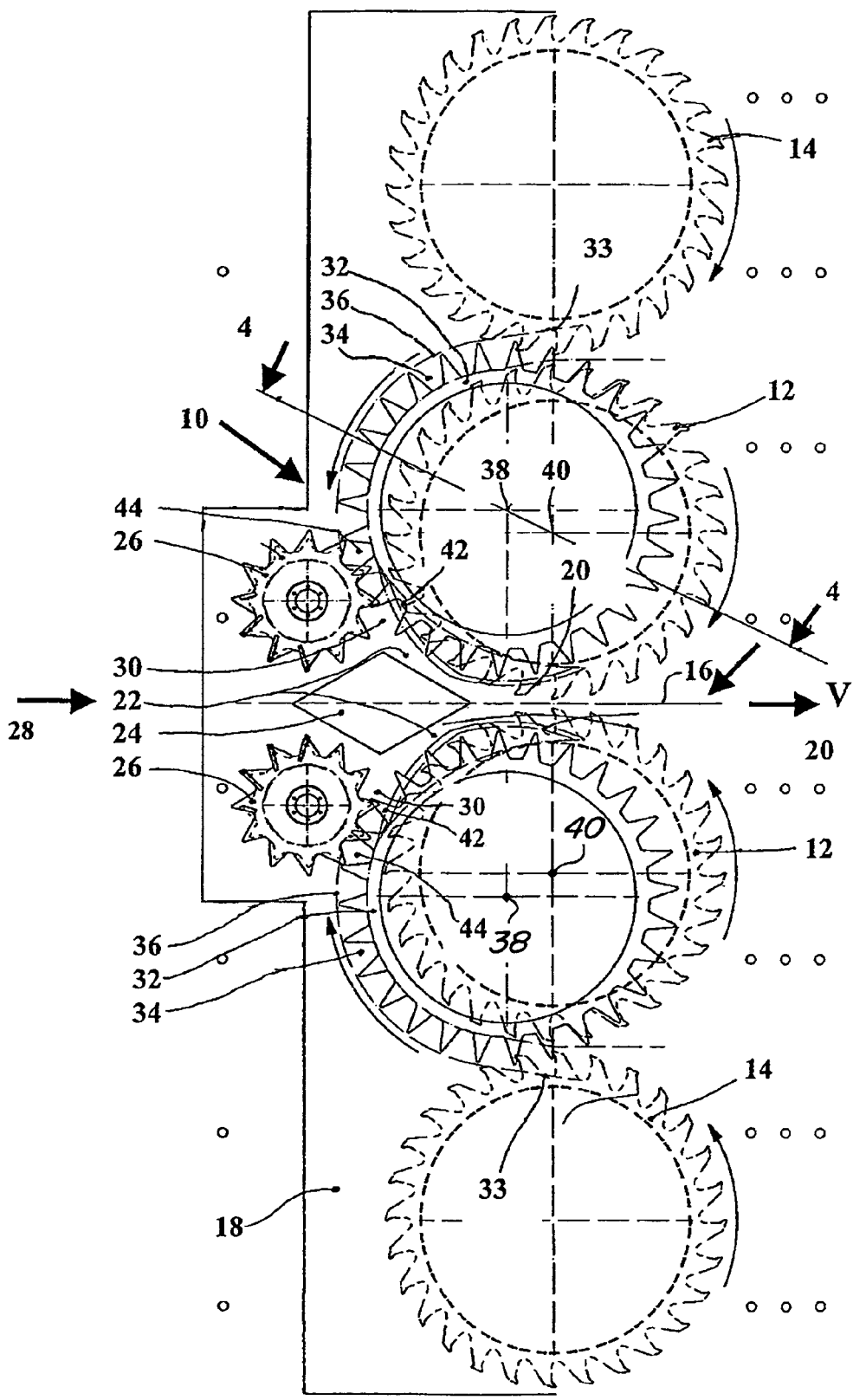
FIG. 1 is a schematic top view showing the crop intake and mowing, and crop conveying drums of a crop harvesting header constructed in accordance with the principles of the invention for harvesting crops having stalks.

Referring now to FIG. 1, there is shown a crop harvesting header 10 for mowing crops having stalks, for example, corn. The header 10 has two inner or first intake and mowing devices 12, and two outer or second intake and mowing devices 14. The mowing devices 12 and 14 are arranged symmetrically to a longitudinal center plane 16 of the machine 10, with the inner two mowing devices 12 being respectively located adjacent to opposite sides of the center plane 16 and with the outer two mowing devices 14 being respectively located on opposite sides of the two inner mowing devices 12 from the center plane 16. The header 10 includes a chassis 18.

In the following, directional terms, such as forward and rearward are referenced relative to a forward direction of travel V, while outer, inner, and lateral are referenced relative to the longitudinal center plane 16 of the machine 10.

The intake and mowing devices 12, 14 are row independent and are assembled from a lower cutting disk, which rotates about an approximately vertical axis, and coaxial conveyor disks, which are arranged above this cutting disk, with the circumference of each conveyor disk being equipped with pocket-like recesses. The cutting disks separate the top parts of the crops being harvested, which can be, in particular, corn, from the stubble remaining at the bottom. The stalks of the harvested crops are received and held in the pocket-like recesses of the conveyor disks. Instead of all or a few of the illustrated rotating intake and mowing devices, intake and mowing devices, which are based on endless conveyors, can also be used. As a rule, crop dividers (not shown) are arranged ahead of the intake and mowing devices 12, 14. During operation, the machine 10 is fixed at the intake channel of a self-propelled field chopper, which moves over a field to be harvested in the direction of travel V.

The rotational direction of the intake and mowing devices 12, 14 used in harvesting operation of the machine 10 are indicated by arrows. The first intake and mowing devices 12 rotate such that the chopped harvested crops are conveyed first inwards, in the direction towards the longitudinal center plane 16, and then rearwards against the direction of travel V. Thus, crops running between the first intake and mowing devices 12 can be harvested without difficulty.

In the region of the first intake and mowing devices 12 adjacent to the longitudinal center plane 16, there are first crop clearing or stripping elements 20, which are connected to the chassis 18 and which remove the harvested crops stalks in the radial direction from the pocket-like recesses of the conveyor disks of the intake and mowing devices 12. Then the plants are led through a conveyor channel 22, which extends diagonally outwards and rearwards and which is limited laterally by the clearing elements 20 and a rhomboidal guide element 24, and especially by the pressure of subsequent plants, which are conveyed through the first intake and mowing device 12 into the effective region of a deflection conveyor 26, in the form of a diagonal conveyor drum, which is built from a cylindrical body with toothed conveyor disks arranged one above the other. It would also be conceivable to eliminate the guide element 24. The deflection conveyors 26 have rotational axes inclined forwards and convey the harvested crops running at a region designated with the reference symbol 30 from the first intake and mowing devices 12 at first inwards and then diagonally rearwards and upwards into the intake channel 28 of the field chopper, in which channel feed rolls (not shown) are arranged one above the other.

The second intake and mowing devices 14 rotate in the same sense with the first intake and mowing devices 12. Shortly before the area of the second intake and mowing devices 14 facing the longitudinal center plane 16, second crop clearing or stripping elements 33 are connected to the chassis 18 in order to discharge the harvested crops from the second intake and mowing devices 14. There the crops are received by cross conveyor elements 32, which are built from two conveyor disks arranged one above the other with pocket-like recesses distributed over their circumference. The cross conveyor elements 32 are arranged in front of the cross conveyor channels 34, which extend between the second clearing elements 33 and the deflection conveyors 26 at the rear side of the header 10. Towards the rear, the cross conveyor channels 34 are delimited by fixed housing walls 36, whose shapes are adapted to the cross conveyor elements 32, i.e., at a constant distance over the length of the cross conveyor channel 34, and which transition in their outer end regions into the second clearing elements 33.

An axis of rotation 38 of the rotary driven cross conveyor element 32 lies within the envelope of, and behind an axis of rotation 40 of, the first intake and mowing devices 12, and offset towards the outside relative to this first device. The conveyor disks of the cross conveyor elements 32 lie in the vertical direction between the conveyor disks of the first intake and mowing devices 12, as can be seen with reference to FIG. 4.

The plants harvested from the second intake and mowing devices 14 are thus conveyed by the cross conveyor element 32 through the cross conveyor channel 34. At the end of the cross conveyor channel 34, third crop clearing or stripping elements 42, which transition into the first clearing elements 20 or are integrated with these elements, convey the harvested goods from the cross conveyor elements 32 outwards. At one region, which is designated by the reference symbol 44, that lies upstream of the region 30, the deflection conveyor unit 26 receives the plants from the cross conveyor channel 34.

Figure 2:
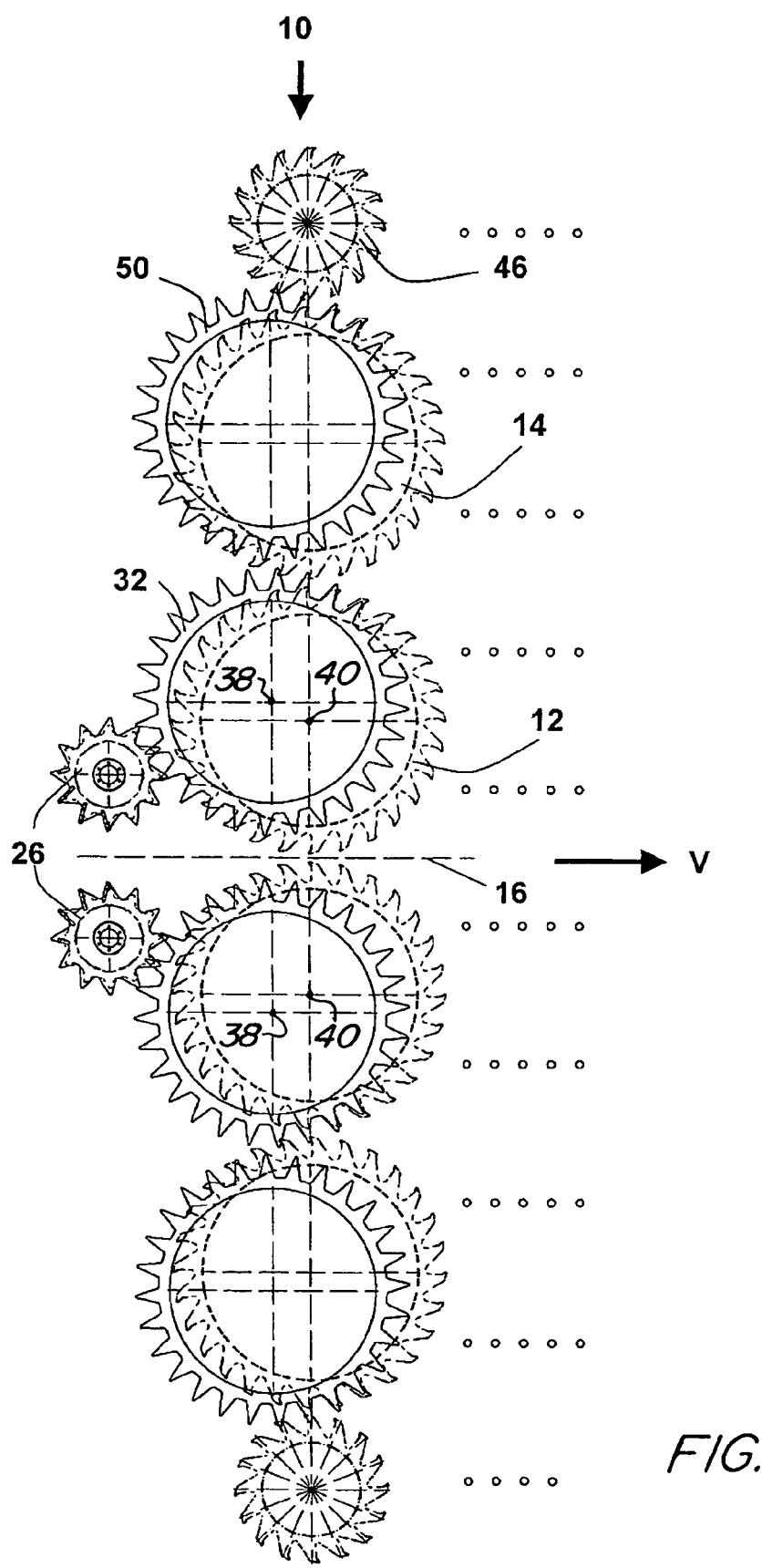
FIG. 2 is a schematic top view of a crop harvesting header having an enlarged working width relative to the embodiment shown in FIG. 1.
Figure 3:
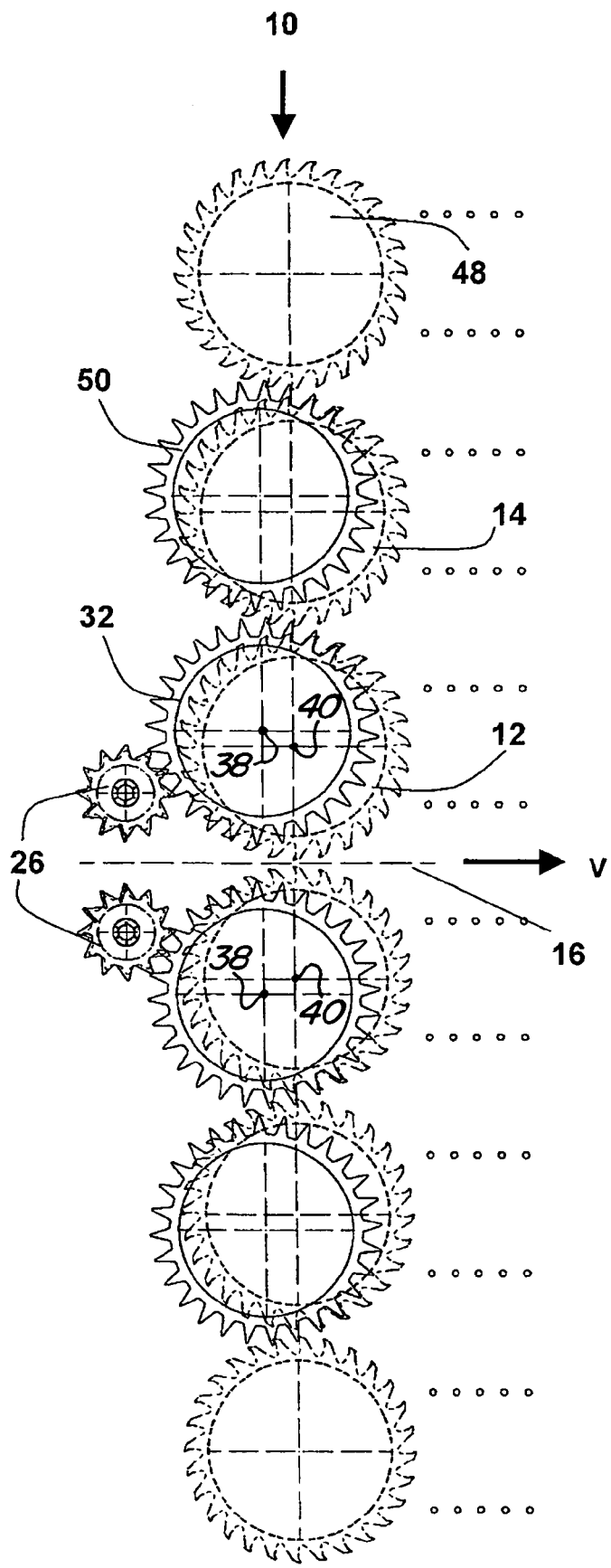
FIG. 3 is a schematic top view of a crop harvesting header having an enlarged working width relative to the embodiment shown in FIG. 2.

The shown embodiment can be modified by adding intake and mowing devices 14 and cross conveyor elements 32 into embodiments with larger working widths, as shown in FIGS. 2 and 3. There, third intake and mowing devices 46 and 48, respectively, are arranged at the side of the second intake and mowing devices 14. The third intake and mowing devices 48 of FIG. 3 have a larger diameter than the third intake and mowing devices 46 of FIG. 2, so that they enable the harvesting of another row of plants, but otherwise have the same construction and the same operation.

The second intake and mowing devices 14 shown in FIGS. 2 and 3 operate analogously to the embodiment shown in FIG. 1 and discharge the harvested crops chopped by them to the cross conveyor elements 32, which are arranged behind the first intake and mowing devices 12 in the direction of travel V. Due to the selected rotational direction of the second intake and mowing devices 14, a cross conveyor element 50, whose positioning, construction, and function corresponds to the cross conveyor element 32, is likewise allocated to these second devices. The cross conveyor element 50 is also assembled from conveyor disks arranged one above the other with pocket-like recesses for holding plant stalks distributed around their circumferences. The conveyor disks of the cross conveyor element 50 are arranged between the conveyor disks of the second intake and mowing device 14, and a cross conveyor channel is similarly defined at its rear side. The cross conveyor elements 50 thus receive the harvested crops cut by the third intake and mowing devices 46 and 48, respectively, which are lifted out by the clearing elements and conveyed in the direction towards the longitudinal center plane 16 of the machine 10. Shortly before reaching an inner region of the cross conveyor element 50, that region closest to the longitudinal center plane 16, the stalks of the harvested crops are lifted out by additional clearing elements (not shown) from the pocket-like recesses of the conveyor disks of the cross conveyor element 50 and then led into the effective outer region of the cross conveyor element 32.

In the embodiments according to FIGS. 2 and 3, additional intake and mowing devices together with cross conveyor elements arranged behind these devices could be inserted between the first and second intake and mowing devices 12, 14 in order to enlarge the working widths even more or to be able to use smaller diameters for the intake and mowing devices 12, 14, 46, 48.

Figure 4:
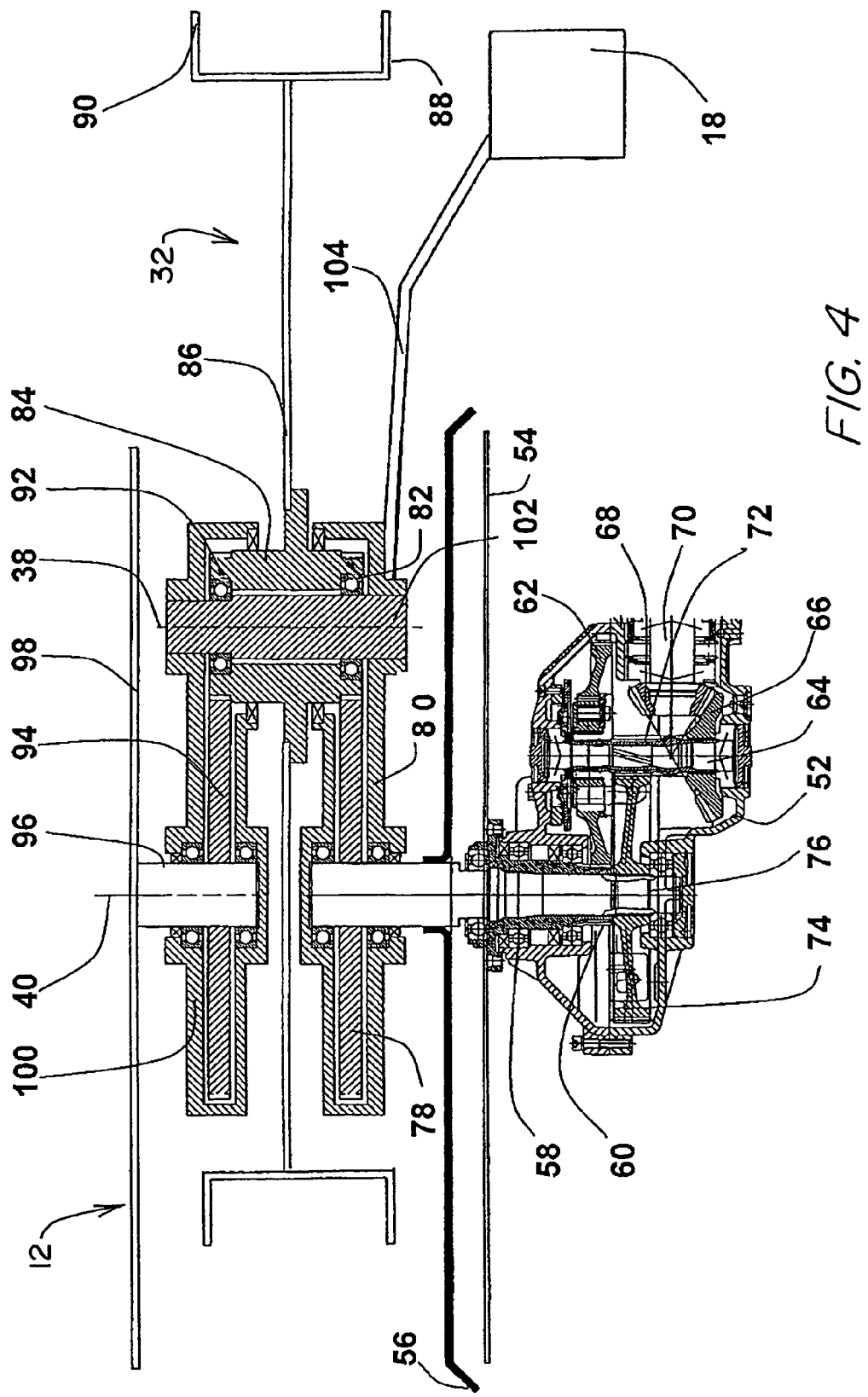
FIG. 4 is a vertical cross-section taken along line 4-4 through the header shown in FIG. 1.

For explaining the construction of the drive of the first intake and mowing devices 12 and the cross conveyor element 32, FIG. 4 shows a vertical section through the header 10 of FIG. 1 taken along line 4-4. The second intake and mowing devices 14 and cross conveyor element 50 from FIGS. 2 and 3 are thus equivalent in terms of construction.

The cutting disk 54, which is mentioned above, is supported so that it can rotate above a lower gear housing 52, which is rigidly connected to the chassis 18. A first conveyor disk 56 of the intake and mowing device 12 is arranged coaxially to the cutting disk 54 and above this disk in the vertical direction. The cutting disk 54 is driven in operation by a hollow shaft 58, which is provided on its lower end with gear teeth 60, which mesh with teeth of a gear 62. The gear 62 is arranged on a shaft 64, which is rotatably mounted in the lower gear housing 52. A first bevel gear 66 is fixed to a lower region of the shaft 64 and is meshed with a bevel gear 66 fixed to one end of a drive shaft 70, which is driven by a main drive shaft (not shown), which is in drive connection with the combustion engine of a self-propelled harvesting machine, which moves the header 10 over a field to be harvested.

At a location below the gear 62, the shaft 64 is provided with gear teeth 72 which are meshed with teeth of a gear 74 fixed to a lower region of a drive shaft 76 which extends through the hollow shaft 58 and the cutting disk 54, and is rotatably supported in the lower gear housing 52. The shaft 76 carries the first conveyor disk 56 and sets this in rotation about the rotational axis 40.

The shaft 76 also drives a first gear 78, which is located in a center gear housing 80, which is attached above the first conveyor disk 56. The first gear 78 meshes with a second gear 82 defining a lower end of a hollow shaft 84, which is located in the center gear housing 80, rotates about the rotational axis 38, and drives a connection disk 86, on whose outer circumference a lower conveyor disk 88 and an upper conveyor disk 90 are located. In addition, an upper end of the shaft 84 defines a third gear 92, which meshes with a fourth gear 94. The fourth gear 94 is fixed to a second shaft 96 and drives the second (upper) conveyor disk 98 of the intake and mowing device 12, which is fixed to an upper end of the second shaft 96. The third and fourth gears 92, 94 are located in an upper gear housing 100, which is connected in turn to the center gear housing 80. The shaft 84 is a hollow shaft and is mounted for rotation about a fixed support shaft 102, which has opposite ends respectively pressed within the center gear housing 80 and the upper gear housing 100 so as to hold them together. The center gear housing 80 is further supported by a support 104, which is fixed to and extends outwards and rearwards in the radial direction from the chassis 18 so as to extend between the cutting disk 54 and the connection disk 86.

The cutting disk 54 and the lower conveyor disk 56, as well as the upper conveyor disk 98 of the first intake and mowing device 12, are arranged coaxially to each other and to the rotational axis 40. Similarly, the conveyor disks 88 and 90 of the conveyor element 32 are arrange coaxially to each other and to the rotational axis 38.

The ratios of the gears 78, 82, 92, and 94 are selected such that the conveyor disks 56 and 98 of the first intake and mowing device 12 rotate at the same speed but faster than the conveyor disks 88 and 90 of the cross conveyor element 32. However, it would also be conceivable that the conveyor speed, i.e., the circumferential speed of the pocket-like recesses of the conveyor disks 88 and 90 of the cross conveyor element 32, could be greater than that of the intake and mowing device 12 or be approximately equal.

In another embodiment, the cutting disk 54 can be supported so that it can rotate on the lower housing 52 and be driven by a gear on its lower side (or a hollow shaft). Through the cutting disk 54 and the gear or the hollow shaft, another hollow shaft can extend, which is used for driving the conveyor disk 56 and the gear 78. Another connection element can be arranged in the interior of the other hollow shaft, which carries the center gear housing 80, so that the support 104 is relieved of stress or can be eliminated.

Figure 5:
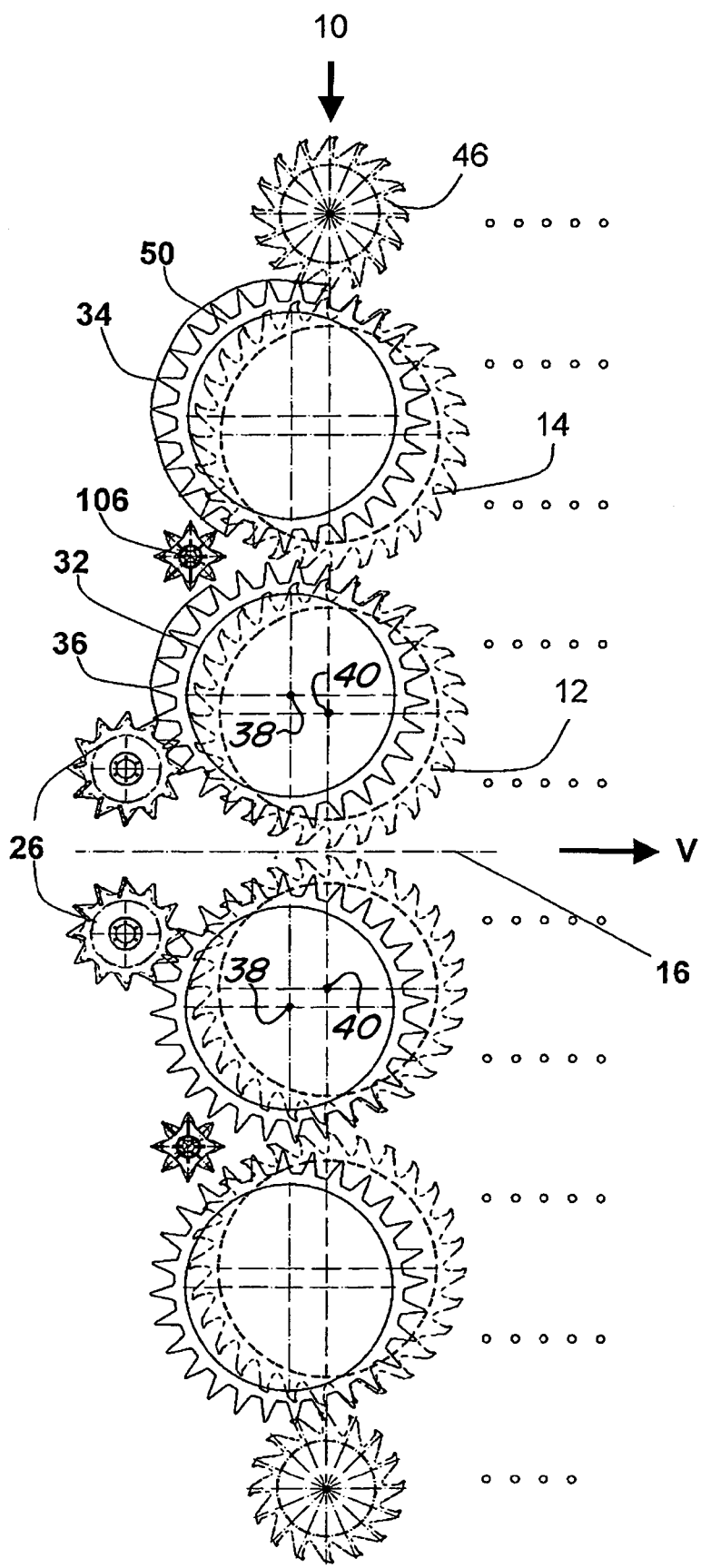
FIG. 5 is a modification of the header illustrated in FIG. 2.
Figure 6:
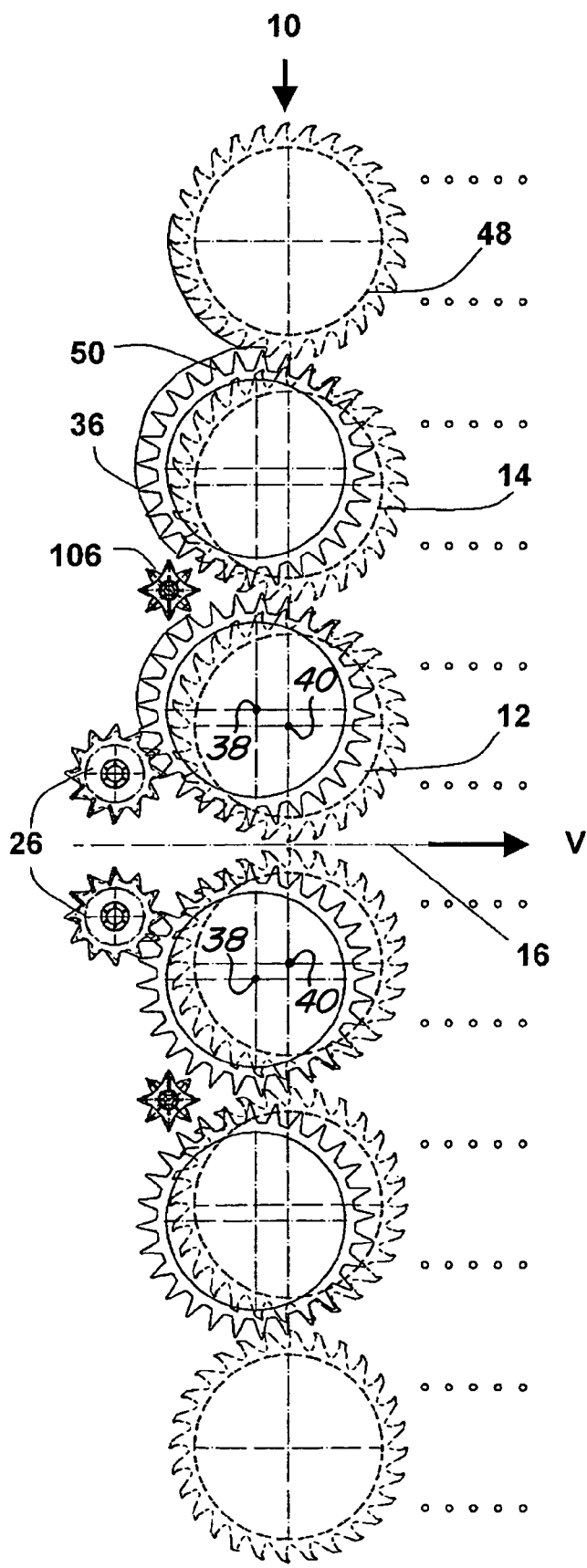
FIG. 6 is a modification of the header illustrated in FIG. 3.
Figure 7:
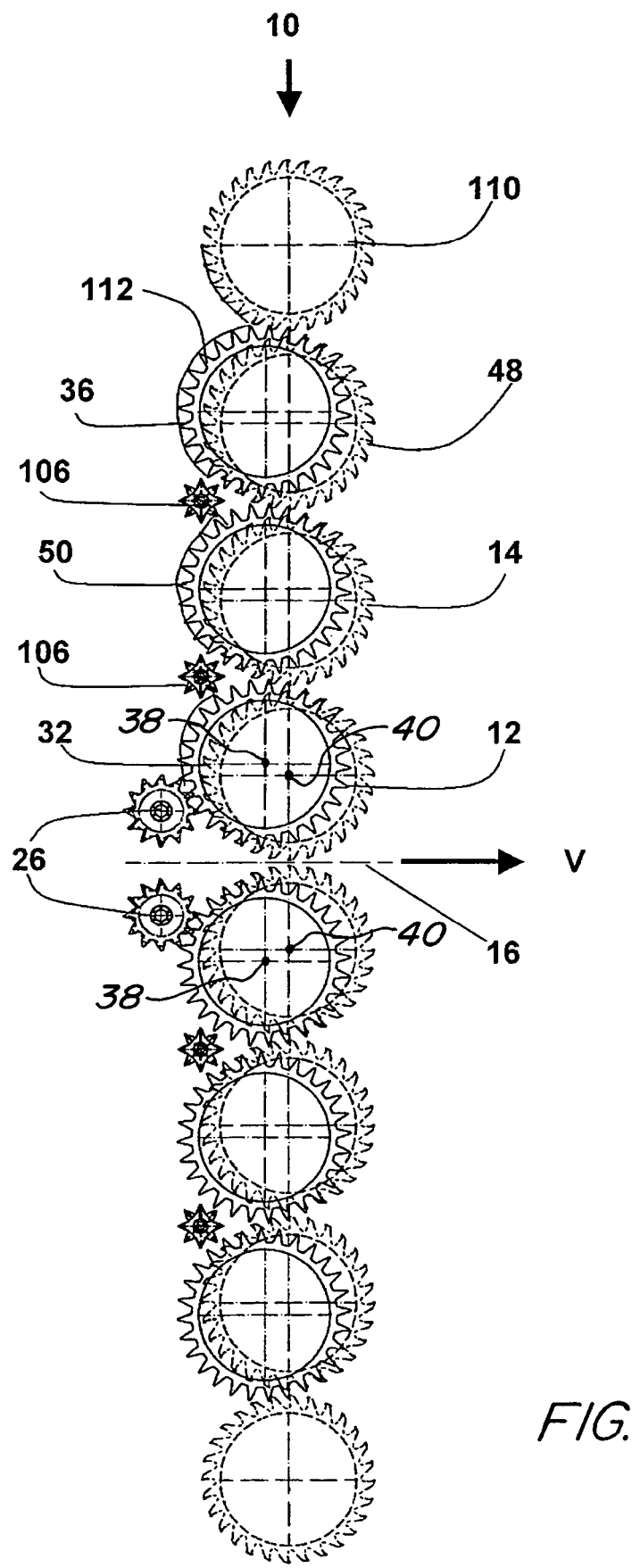
FIG. 7 is a top view of a header having an even larger working width than any of the headers illustrated in the other views.

In FIGS. 5-7, other embodiments of the invention are shown, wherein elements that match those of previously described headers are provided with the same reference numerals.

The header 10 in FIG. 5 corresponds essentially to the embodiment shown in FIG. 2. However, one difference is the addition of a cross conveyor drum 106 in the wedge-shaped region between the cross conveyor element 50 of the second intake and mowing device 14 and the cross conveyor element 32 of the first intake and mowing device 12. The cross conveyor drums 106 correspond in construction and function to the cross conveyor drums from EP 0 760 200 A. They are built from a rotational body with an approximately vertical rotational axis, which is provided with conveyor disks arranged one above the other with conveyor teeth. The cross conveyor drums 106 are arranged behind the cross conveyor channel 34. The conveyor teeth of its conveyor disks extend through suitable slots in the rear wall 36, which delimits rear side of the cross conveyor channel 34. Through suitable clearing elements (not shown), such as skids or bars, the harvested crops are lifted from the cross conveyor elements 50 and received by the conveyor teeth of the cross conveyor drums 106, which convey it in the direction towards the longitudinal center plane 16. Directly downstream of this transfer region, the conveyor teeth of the cross conveyor drums 106 also receive the harvested crops from the second intake and mowing devices 14. Then the cross conveyor element 32 of the first intake and conveyor device 12 receives the harvested crops from the cross conveyor drum 106.

With the exception of the addition of the previously described cross conveyor drum 106, the embodiment shown in FIG. 6 matches that from FIG. 3.

The header 10 shown in FIG. 7 also includes fourth intake and mowing devices 110. Therefore, a cross conveyor element 112 is allocated to the third intake and mowing devices. In construction, the third intake and mowing devices 48 with the cross conveyor element 112 correspond in this embodiment to the second intake and mowing devices 14 with the cross conveyor element 50. In the wedge-shaped region between the cross conveyor element 112 of the third intake and mowing device 48 and the cross conveyor element 50 of the second intake and mowing device, a cross conveyor drum 106 is likewise arranged, like that described in reference to FIG. 5. Another cross conveyor drum 106 is located in the wedge-shaped region between the cross conveyor elements 50 and 32. The rotational directions of the intake and mowing devices 12, 14, 48, and 110 of FIG. 7 extend such that in the normal harvesting operation, the harvested crops are cut and conveyed first in the direction towards the longitudinal center plane 16 of the header 10. In this way, conveyance problems between intake and mowing devices rotating in opposite senses are eliminated.

For reverse operation, the driven elements of the machine 10 each rotate in the opposite senses to the described rotational directions.

Having described the preferred embodiment, it will become apparent that various modifications can be made without departing from the scope of the invention as defined in the accompanying claims.

The invention claimed is:

1. In a crop harvesting header, for harvesting crops having stalks, including a plurality of intake and mowing devices arranged laterally one next to the other for cutting and conveying the harvested crops, with a first intake and mowing device being located laterally adjacent to a second intake and mowing device at a location between said second intake and mowing device and a longitudinal center plane of the header, a deflection conveyor unit having an upright rotational axis, which is inclined slightly forwards, bridging a vertical distance between a working plane of the intake and mowing devices and a plane of an outlet channel defined in a rear wall of said harvesting header, in centered relationship to said center plane, with said deflection conveyor being located behind said intake and mowing devices and proximate said outlet channel for delivering cut harvested crops through said outlet channel for being introduced into an intake channel of a harvesting machine, said first and second intake and mowing devices being adapted for being driven such that they convey cut harvested crops first inward toward said center plane and then rearward, said first intake and mowing device being rotatable about a first axis, the improvement comprising: a cross conveyor channel extending behind said first intake and mowing device from a location adjacent said second intake and mowing device to a location adjacent said deflection conveyor unit; and a cross conveyor element mounted for rotation about an upright axis in a direction opposite to that of said second intake and mowing device and being sized and positioned for sweeping through said cross conveyor channel so as to convey harvested crop, cut by said second intake and mowing device, to said deflection conveyor independently of said first intake and mowing device and said cross conveyor element being rotatable about a second rotational axis approximately parallel to said first rotational axis, said first intake and mowing device having at least two vertically spaced conveying disks provided with recesses for receiving plant stalks; and said cross conveyor element including at least one conveyor disk provided with recesses for receiving plant stalks and arranged in the vertical direction between said at least two conveying disks of said first intake and mowing device and the header further including a transmission arrangement for driving said first intake and mowing device; said transmission arrangement including upper and lower gear housings; a connection element extending between and interconnecting said upper and lower gear housings; a hollow shaft received on said connection element; and said lower housing containing drive elements connected for driving said hollow shaft; and said upper housing including drive elements coupled between said hollow shaft and an upper one of said at least two vertically spaced conveying disks.

2. The crop harvesting header, as defined in claim 1, wherein said cross conveyor element is arranged in front of said cross conveyor channel.

3. The crop harvesting header, as defined in claim 2, wherein said cross conveyor channel has a rear side delimited by a fixed, upright wall disposed at a radius about said upright axis of said cross conveyor element; and said cross conveyor element being oriented to convey the harvested crops in interaction with said rear wall.

4. The crop harvesting header, as defined in claim 1, wherein outer peripheral parts of said first intake and mowing device trace a cylindrical envelope during operation; and said second rotational axis being within said cylindrical envelope.

5. The harvesting header, as defined in claim 1, wherein said cross conveyor element and said intake and mowing device have radii which are approximately equal.

6. The harvesting header, as defined in claim 1, wherein said first intake and mowing device is directly adjacent to said center plane.

7. In a crop harvesting header, for harvesting crops having stalks, including a plurality of intake and mowing devices arranged laterally one next to the other for cutting and conveying the harvested crops, with a first intake and mowing device being located laterally adjacent to a second intake and mowing device at a location between said second intake and mowing device and a longitudinal center plane of the header, a deflection conveyor unit having an upright rotational axis, which is inclined slightly forwards, bridging a vertical distance between a working plane of the intake and mowing devices and a plane of an outlet channel defined in a rear wall of said harvesting header, in centered relationship to said center plane, with said deflection conveyor being located behind said intake and mowing devices and proximate said outlet channel for delivering cut harvested crops through said outlet channel for being introduced into an intake channel of a harvesting machine, said first and second intake and mowing devices being adapted for being driven such that they convey cut harvested crops first inward toward said center plane and then rearward, the improvement comprising: a cross conveyor channel extending behind said first intake and mowing device from a location adjacent said second intake and mowing device to a location adjacent said deflection conveyor unit; and a cross conveyor element mounted for rotation about an upright axis in a direction opposite to that of said second intake and mowing device and being sized and positioned for sweeping through said cross conveyor channel so as to convey harvested crop, cut by said second intake and mowing device, to said deflection conveyor independently of said first intake and mowing device harvesting header further including a third intake and mowing device located adjacent said second intake and mowing device and further outward from said center plane than said second intake and mowing device, said first intake and mowing device having at least two vertically spaced conveying disks provided with recesses for receiving plant stalks; and said cross conveyor element including at least one conveyor disk provided with recesses for receiving plant stalks and arranged in the vertical direction between said at least two conveying disks of said first intake and mowing device; a second cross conveyor channel extending behind said second intake and mowing device between said third and second intake and mowing devices; and a second cross conveyor element being located and operated so that harvested crop cut by said third intake and mowing device is conveyed independently of said second intake and mowing device through said second cross conveyor channel towards said center plane of the harvesting header and the header further including a transmission arrangement for driving said first intake and mowing device; said transmission arrangement including upper and lower gear housings; a connection element extending between and interconnecting said upper and lower gear housings; a hollow shaft received on said connection element; and said lower housing containing drive elements connected for driving said hollow shaft; and said upper housing including drive elements coupled between said hollow shaft and an upper one of said at least two vertically spaced conveying disks.

8. The harvesting header, as defined in claim 7, and further including at least a fourth intake and mowing device arranged next to, and farther outward from said center plane than, said third intake and mowing device; a third cross conveyor element being located and operated so that harvested crop cut by said fourth intake and mowing device is conveyed independently of said third intake and mowing device through said third cross conveyor channel towards said center plane of the harvesting header.

9. The harvesting header, as defined in claim 7, wherein said first-mentioned and second cross conveyor elements define a wedge-shaped region adjacent rear sides of said first-mentioned and second cross conveyor elements; and a cross conveyor drum being located in said wedge-shaped region for conveying crop from said second, to said first-mentioned, cross conveyor element.

10. In a crop harvesting header, for harvesting crops having stalks, including a plurality of intake and mowing devices arranged laterally one next to the other for cutting and conveying the harvested crops, with a first intake and mowing device being located laterally adjacent to a second intake and mowing device at a location between said second intake and mowing device and a longitudinal center plane of the header, a deflection conveyor unit having an upright rotational axis, which is inclined slightly forwards, bridging a vertical distance between a working plane of the intake and mowing devices and a plane of an outlet channel defined in a rear wall of said harvesting header, in centered relationship to said center plane, with said deflection conveyor being located behind said intake and mowing devices and proximate said outlet channel for delivering cut harvested crops through said outlet channel for being introduced into an intake channel of a harvesting machine, said first and second intake and mowing devices being adapted for being driven such that they convey cut harvested crops first inward toward said center plane and then rearward, the improvement comprising: a cross conveyor channel extending behind said first intake and mowing device from a location adjacent said second intake and mowing device to a location adjacent said deflection conveyor unit; and a cross conveyor element mounted for rotation about an upright axis in a direction opposite to that of said second intake and mowing device and being sized and positioned for sweeping through said cross conveyor channel so as to convey harvested crop, cut by said second intake and mowing device, to said deflection conveyor independently of said first intake and mowing device and wherein said cross conveyor element and said deflection conveyor unit are so located relative to each other and to said first intake and mowing device that said cross conveyor element delivers crop to said deflection conveyor unit at a region which is upstream of a region where crop is delivered to said deflection conveyor unit by said first intake and mowing device, said first intake and mowing device having at least two vertically spaced conveying disks provided with recesses for receiving plant stalks; and said cross conveyor element including at least one conveyor disk provided with recesses for receiving plant stalks and arranged in the vertical direction between said at least two conveying disks of said first intake and mowing device and the header further including a transmission arrangement for driving said first intake and mowing device; said transmission arrangement including upper and lower gear housings; a connection element extending between and interconnecting said upper and lower pear housings; a hollow shaft received on said connection element; and said lower housing containing drive elements connected for driving said hollow shaft; and said upper housing including drive elements coupled between said hollow shaft and an upper one of said at least two vertically spaced conveying disks.

* * * * *